United States Patent
Pan et al.

(10) Patent No.: US 7,290,482 B2
(45) Date of Patent: Nov. 6, 2007

(54) TOASTER WITH REMOVABLE IMAGING PLATES

(75) Inventors: Huan Dong Pan, CiXi Zheliang (CN); Linda Carlish Kaplan, New York, NY (US)

(73) Assignee: LC Premiums, Ltd., New York, NY (US)

( * ) Notice: Subject to any disclaimer, the term of this patent is extended or adjusted under 35 U.S.C. 154(b) by 86 days.

(21) Appl. No.: 11/107,378

(22) Filed: Apr. 15, 2005

(65) Prior Publication Data

US 2006/0180033 A1    Aug. 17, 2006

Related U.S. Application Data

(60) Provisional application No. 60/652,242, filed on Feb. 11, 2005.

(51) Int. Cl.
    *A47J 37/08*  (2006.01)
(52) U.S. Cl. ............... 99/388; 99/389; 219/521
(58) Field of Classification Search .......... 99/325–333, 99/385–393, 450; 219/521–525; 426/523
    See application file for complete search history.

(56) References Cited

U.S. PATENT DOCUMENTS

| | | | | | |
|---|---|---|---|---|---|
| 1,892,117 | A | * | 12/1932 | Perkins | 99/388 |
| 2,483,669 | A | * | 10/1949 | Reid | 219/478 |
| 4,656,927 | A | * | 4/1987 | Mosby et al. | 99/388 |
| 5,156,637 | A | * | 10/1992 | Wai-Ching | 99/388 |
| 6,112,648 | A | * | 9/2000 | Origane | 99/388 |
| 2004/0129148 | A1 | | 7/2004 | Romano | |

* cited by examiner

*Primary Examiner*—Timothy F. Simone
(74) *Attorney, Agent, or Firm*—Gottlieb, Rackman & Reisman

(57) ABSTRACT

A toaster system having selectively removable imaging plates is provided. The system includes a toaster having at least one toast receiving compartment with heating elements disposed along both sides thereof for facing the food item to be toasted. The system also includes a plurality of metal imaging plates, each individually and selectively receivable in and removable from the toast receiving compartment at a location between one of the heating elements and the inserted food item that is to be toasted.

11 Claims, 5 Drawing Sheets

TOASTER WITH REMOVABLE IMAGING PLATES

BACKGROUND OF THE INVENTION

This application claims priority of Provisional Application Ser. No. 60/652,242, filed Feb. 11, 2005.

This invention relates to a kitchen toaster, and more particularly to a kitchen toaster having one or more selectively removable metal imaging plates through which heat from the heating elements within each slot of the toaster can be blocked in a particular pattern or design, thereby allowing an image or name (brand) to form on the toast (or other bread-like item) after toasting.

Conventionally, a toaster simply heats a slice of bread, a bagel, waffle, etc. to a degree where both surfaces thereof are toasted to a desired level. Generally, this level is uniform along both sides of the toasted bread.

An improved kitchen toaster exists in the prior art that contains an integrated, non-removable branding plate that allows an image or brand to form upon the toasted bread during toasting. The plate has a design or pattern cutout therealong so that that toasted pattern or design forms on the bread, whereas the rest of the surface of the bread is untoasted since it is blocked by the metal plate from receiving heat.

With this integrated, non-removable plate of the prior art toaster design, the same image or message is always produced on one side of the toast. This is less than desirable since there is no ability to have a different message printed on the toast during the life of the toaster and because this particular toaster cannot be used to fully burn-off both sides of bread, bagels and the like (like a conventional toaster), and cannot be used for toasting other eating items such as pop-tarts and English muffins where complete toasting of both sides may be desired.

SUMMARY OF THE INVENTION

A toaster system having selectively removable imaging plates is provided. The system includes a toaster having at least one toast receiving compartment with heating elements disposed along both sides thereof for facing the food item to be toasted. The system also includes a plurality of metal imaging plates, each individually and selectively receivable in and removable from the toast receiving compartment at a location between one of the heating elements and the inserted food item that is to be toasted.

Significantly, each plate includes a unique design that is transferable onto one side of the food item that is to be toasted when the heating elements are activated. The design is preferably defined by a cut-out region in the plate.

Accordingly it is an object of the invention to provide a toaster having one or more selectively removable metal imaging plates.

Another object is to provide a plurality of imaging plates having different images so that a variety of images can be imprinted on the food item to be toasted.

Still other objects and advantages of the invention will, in part, be obvious and will, in part, be apparent from the following description.

BRIEF DESCRIPTION OF THE DRAWINGS

For a fuller understanding of the invention, reference is made to the following description, taken in connection with the accompanying drawings, in which.

DESCRIPTION OF THE PREFERRED EMBODIMENT

Figure 6:
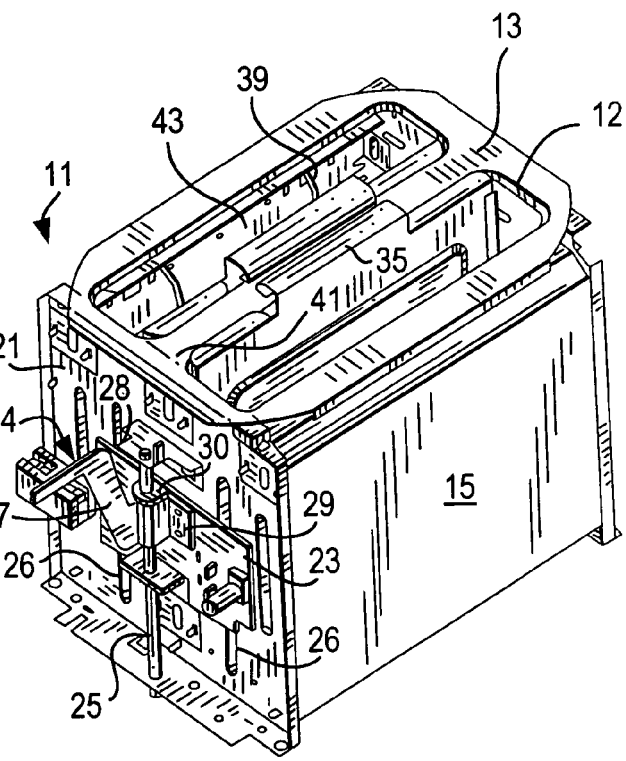
FIG. 6 is a perspective view of the inventive toaster assembly as viewed from the front.
Figure 9:
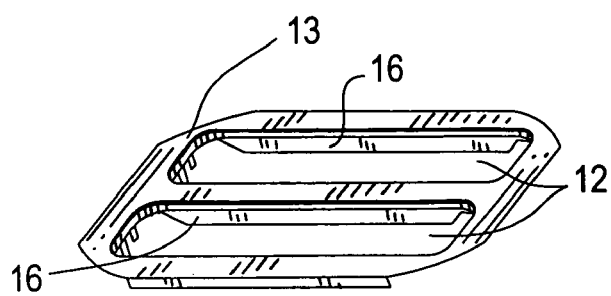
FIG. 9 is a perspective view of the cover used in the inventive toaster assembly.
Figure 11:
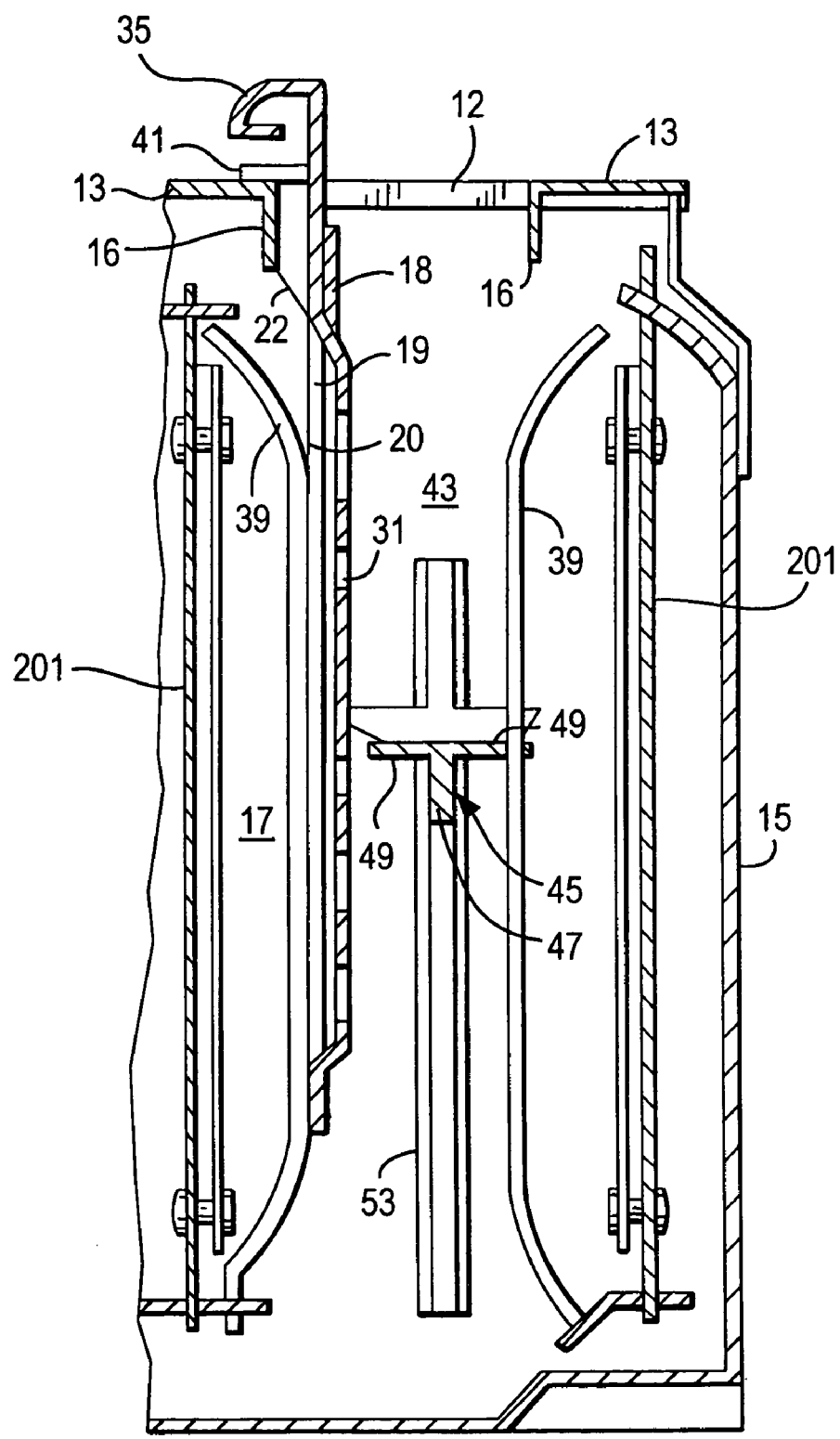
FIG. 11 is a cross-sectional view taken along line 11-11 of FIG. 5.

Referring to FIG. 6, the toaster assembly 11 of the invention is defined by a front panel 21, a back panel 51 (see FIG. 2), a pair of side panels 15 and a cover 13 (see also FIG. 9) having a pair of longitudinally extending openings 12 defined by downwardly extending flanges 16 (FIG. 11). Openings 12 lead to a pair of rectangularly configured toast receiving compartments 43, each having a pair of metallic heating elements 201 on opposite sides thereof (see FIG. 11).

Mounted along the inside facing surfaces of front panel 21 and back panel 51 are a pair of end plates 17 (see FIGS. 1 and 8), each having a pair of outside longitudinally extending edge walls 18 (FIG. 7) and a pair of corresponding parallel running ribs 20 for defining a pair of slots 19. Each of slots 19 are used to facilitate reception of an imaging metal plate 31 (FIG. 11), as described hereinbelow. Note that each of ribs 20 has an angled guide portion 22 at the top thereof (FIG. 7) to facilitate reception of the edge of the imaging plate within slot 19.

Figure 2:
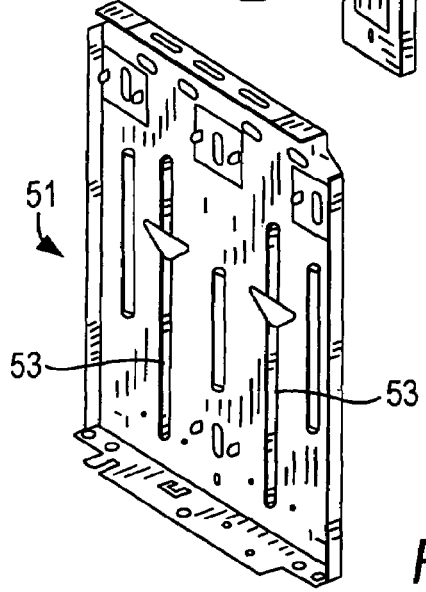
FIG. 2 is a perspective view of the rear panel of the inventive toaster assembly.
Figure 3:
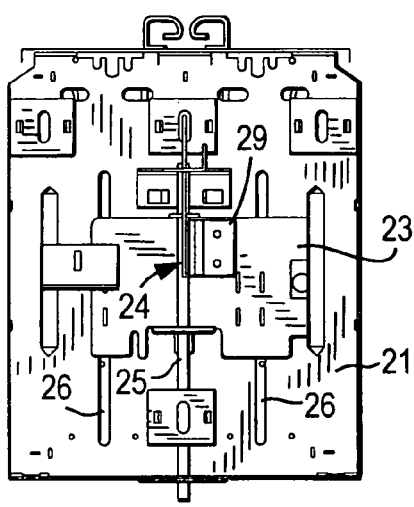
FIG. 3 is a front elevational view of the front panel of the inventive toaster assembly.
Figure 5:
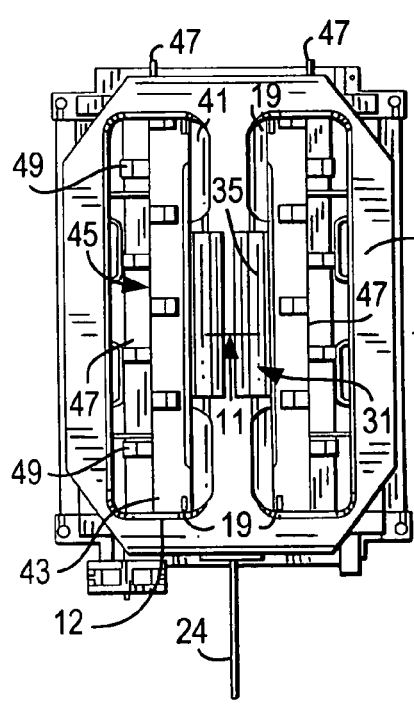
FIG. 5 is a top plan view of the inventive toaster assembly.

As shown in FIGS. 3 and 6, front plate 21 is formed with a pair of longitudinally extending slots 26; similarly, rear plate 51 is formed with a corresponding pair of longitudinally extending slots 53 (FIG. 2 and FIG. 11). Slots 26 and 53 are designed for slidably receiving arms 47 of the two toast compartment supports 45 (see FIGS. 5 and 10) that are retained within the pair of toast receiving compartments 43.

Figure 10:
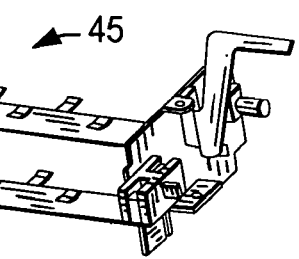
FIG. 10 is a perspective view of the toast supports of the inventive toaster assembly.

As shown best in FIG. 10 and FIG. 11, toast supports 45 each include a running arm 47 and a plurality of alternately directed depending supporting ribs 49 on which bread or another item to be toaster is seated. Arms 47 are slidably received within slots 26 and 53 of front panel 21 and back panel 51 respectively (see FIGS. 5 and 6). In order to enable each of toaster supports 45 to move between an upper inactive toasting condition and a lower active toasting condition, as is well known, actuation of a handle is initiated, as now discussed.

Figure 4:
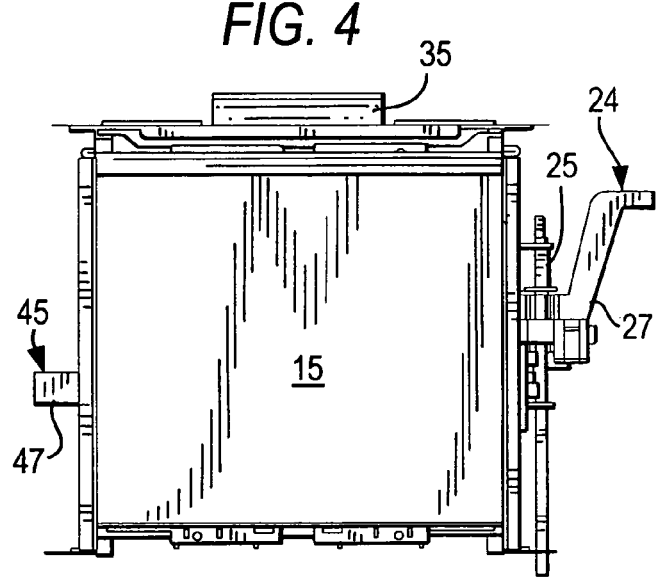
FIG. 4 is a side elevational view of the side panel of the inventive toaster assembly.

Slidably mounted along front panel 21 is a handle assembly generally indicated at 24 (FIGS. 3, 4 and 6). Handle assembly 24 includes a slide plate 23 to which arms 47 of toast supports 45 (which extend through slot 26 of panel 21) are fixedly connected. Handle assembly 24 also includes a handle plate 29 fixedly mounted onto slide plate 23, a cradle 30 through which a slide rod 25 extends, and an outwardly extending handle 27. In operation, handle 27 is maintained in an upper position (see FIG. 6) in response to a spring member (not shown) and may be selectively pushed downwardly, thereby urging slide plate 23 in a downward direction and thereby moving arms 47 of toast supports 45 to a downward toasting position. It is noted that a rod support plate 28 is fixedly mounted to and perpendicularly depends from front panel 21 in order to fix rod 25 in position and to also function as an upper stop to handle assembly 24.

Figure 1:
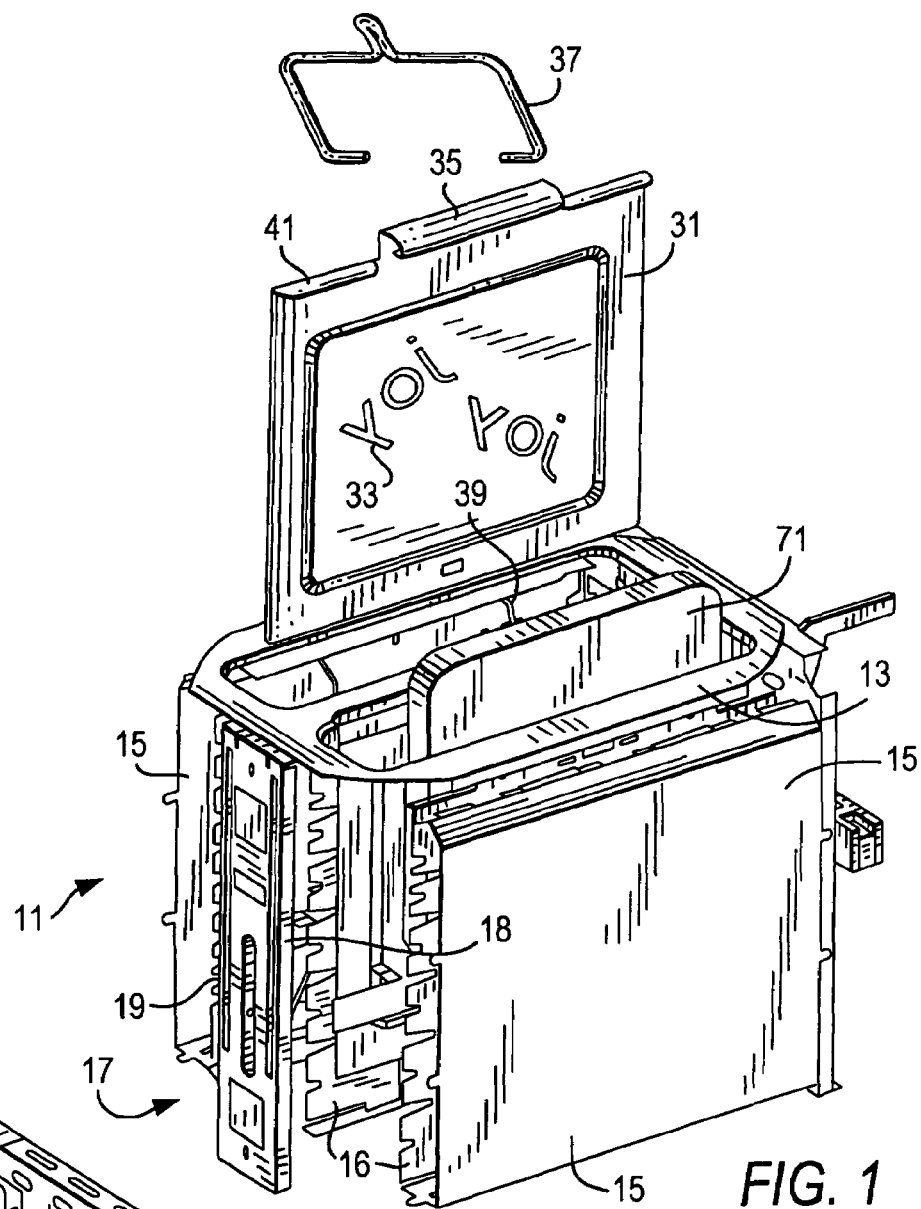
FIG. 1 is a partially exploded perspective view of the inventive toaster assembly.
Figure 7:
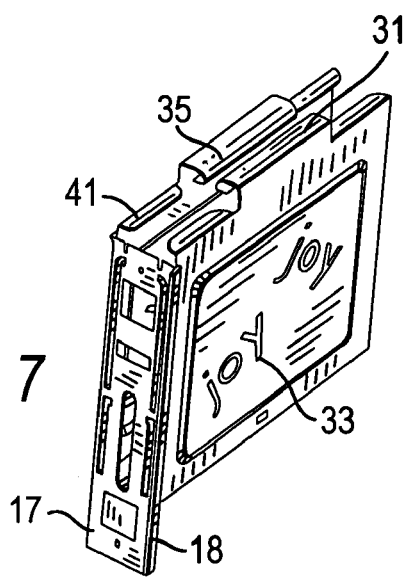
FIG. 7 is a perspective view of a pair of selectively removable plates that are suitable for the inventive toaster assembly.
Figure 8:
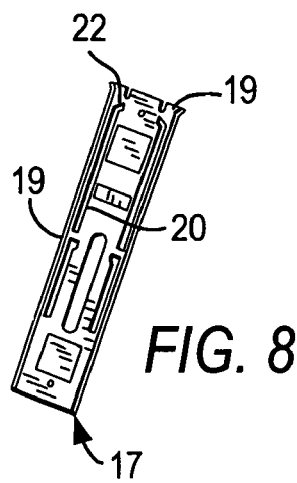
FIG. 8 is a front elevational view of one of the end plates used in the inventive toaster assembly.

Turning our attention to FIGS. 1 and 7, imaging metal plates 31 are substantially rectangular in configuration and include a design 33 (in this case, the words "Joy") punched out therefrom. The top edge of each of plates 31 is formed with a central lift handle 35 and a pair of running lips 41 on either side of handle 35 (see also FIG. 11). In use, as shown in FIGS. 6 and 11, lips 41 abut against cover 13 when plate 31 is inserted within toast receiving compartment 43 (between slots 19 formed on the pair of end plates 17—see FIG. 5). If it is desired to remove plate 31 from compartment 43, a clincher 37 (FIG. 1) may be used. Clincher 37 has a pair of inwardly directed fingers for fitting underneath handle 35 so that plate 31 may be lifted out from compartment 43 of toaster assembly 11.

In accordance with the inventive toaster assembly, bread or other items to be toasted can be imprinted with any logo, design or wording which is desired by producing selectively removable plates which are formed with a cut-out of the desired logo, design or words.

In use, each imaging metal plate is pushed downward into the slot formed within the toasting compartment until the lips thereof abut against and hang along the cover of the toaster assembly. Thereafter, when bread 71 or another item to be toasted is disposed within a toast receiving compartment (facilitated by centering wires 39—see FIGS. 1 and 11), and the handle is pressed down to position the compartment to an active toasting condition (heating elements 20 will then heat up), bread or another item will be toasted completely on one side, but, on the other side, the bread or other item is toasted to imprint the logo, design or wording of the imaging plate.

Alternatively, a metal plate may be designed so that the logo, design or wording to be imprinted on the bread is the metal portion of the plate and the remaining portion of the plate is open. As a result, when toasting, the bread or other item will be toasted completely on one side, and almost completely on the other side, except where the logo, design or wording is depicted.

As can be appreciated, the imaging metal plates are selectively removable from the toast receiving compartments, giving the user the option of conventional toasting (fully toasting both sides of the bread) or toasting with one side imprinted with a design.

Figure 12:
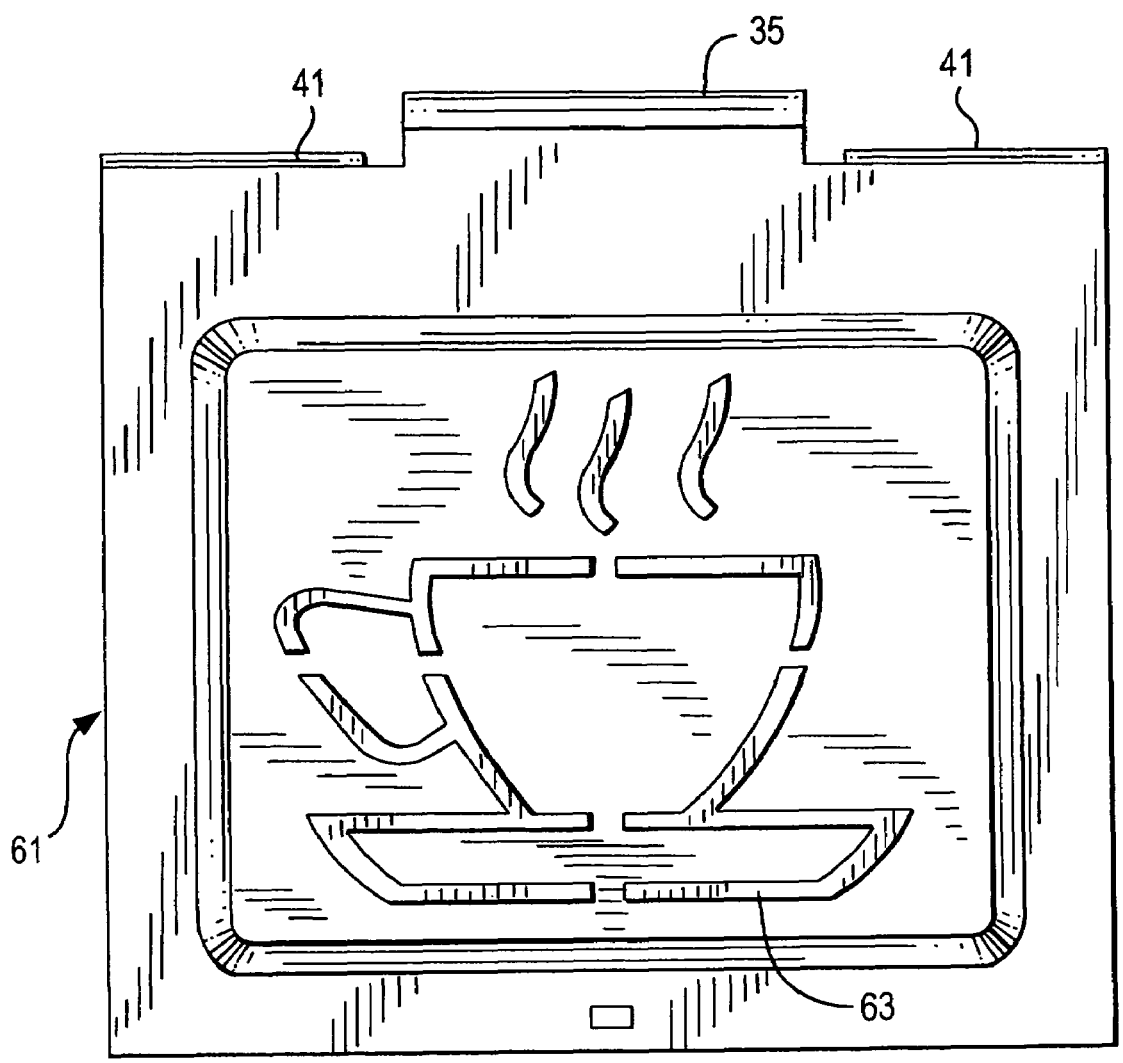
FIG. 12 is a top plan view of a removable plate with a design different than that depicted in FIG. 7.

Also, a series of different metal plates, each cut out with a different logo, design or wording, such as plate 61 depicted in FIG. 12, may be provided for selective use, as desired, with the inventive toaster. Plate 61 is shown with an image 63 (in this case, a "cup") punched out therefrom.

It will thus be seen that the objects set forth above, and those made apparent from the preceding description, are efficiently attained, and since certain changes may be made in the products set forth above without departing from the spirit and scope of the invention, it is intended that all matter contained in the above description and shown in the accompanying drawing shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

The invention claimed is:

1. A toaster system comprising:
   a toaster having a top portion with an opening leading to one or more receiving compartments each sized for selectively receiving a food item to be toasted; each compartment being formed between two walls; a pair of heating elements disposed along either side of said compartment and facing said food item when said item is received therein; said compartment having a pair of parallel slots formed vertically along one of said walls, respectively between said food item when received therein and one of said heating elements; and
   a plurality of imaging plates each having a unique image or design different than that of the other imaging plates; wherein each imaging plate is selectively receivable in and removable from said slots;
   wherein said unique image or design of the selected plate is transferable onto one side of said received food item when said heating elements are activated and the selected plate is received in said slots.

2. The system of claim 1, wherein said compartment includes a support on which said food item rests when received therewithin.

3. The system of claim 2, wherein said support is movable between upper and lower positions in said compartment.

4. The system of claim 1, wherein each imaging plate includes a top portion having a handle for selectively lifting the plate and a lip for supporting the plate along the top portion of the toaster when the plate is received in said compartment.

5. A toaster system comprising:
   a toaster housing having an opening leading to a toaster receiving compartment for selectively receiving a food to be toasted, said compartment having two opposed side walls, each side wall having a slot;
   a heater disposed within said housing with said slots being positioned between said compartment and said heater;
   an imaging plate having a substantially rectangular body with two opposed lateral edges spaced to fit and be guided between said slots into said compartment, said plate being formed with a hole shaped to form a design; and
   a support structure disposed in said compartment and movable between an upper position and lower position, said support structure being sized and shaped to support said food, said support structure being movable with respect to said housing and said imaging plate secured in said housing by said guide slots;
   wherein said heater is activated while said support structure is in said lower position and wherein heat from heater cause said design to be formed on said food.

6. The toaster system of claim 5 wherein said image plane is maintained in a fixed position within said housing by said guide slots as said food is inserted and removed from said compartment.

7. The toaster system of claim 5 further comprising a plurality of image plates, each plate being sized and shaped to fit between said guide slots and each plate having a different image.

8. A toaster comprising:

a housing defining a rectangular compartment with two lateral sides and a pair of parallel slots disposed along one of said sides;

a pair of heaters mounted within said housing along said lateral sides;

a toast support structure movable within said compartment and adapted to selectively lower and raise a piece of toast within said compartment, said pair of parallel slots being disposed between one of said heaters and said toast support structure; and an imaging plate having a rectangular body slidably disposed between and being engaged by said slots and a hole with a hole outline defining a unique design to cause heat from said heater to pass through said hole and form on said toast said unique design.

9. A toaster comprising:

a toaster body having a compartment defining a space for receiving food items to be toasted, said compartment having two opposed side walls and two opposed end walls, each said end wall being formed with at least a first slot;

at least a first heater disposed within said body along one of said side walls; and a first image plate having a flat surface with a cutout formed with an image, said image plate being removably supported by said first slots between said first heater and said space, whereby when foodstuff is inserted into said space and the heater is activated, heat from said heater passes through said cutout to superimpose said image on said foodstuff.

10. The toaster of claim 9 further comprising a second heater, disposed outside said space and arranged to radiate heat into said space, wherein each said end wall is formed with a second slot, said second slots accepting a second image plate, said second image plate being removable from said second slots.

11. The toaster of claim 9 further comprising a support arranged and constructed to partially insert and remove foodstuff from said opening.

* * * * *